United States Patent
Sapija et al.

(10) Patent No.: US 12,331,846 B2
(45) Date of Patent: Jun. 17, 2025

(54) VALVE POSITION DETECTION

(71) Applicant: Goodrich Corporation, Charlotte, NC (US)

(72) Inventors: Dariusz Sapija, Lowersilesian (PL); Agata Kurowska-Kalińska, Kowale (PL); Piotr Kroczek, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/670,699

(22) Filed: Feb. 14, 2022

(65) Prior Publication Data

US 2022/0260179 A1    Aug. 18, 2022

(30) Foreign Application Priority Data

Feb. 15, 2021   (EP) .................................. 21461513

(51) Int. Cl.
*F16K 37/00*   (2006.01)
*F16K 31/04*   (2006.01)

(52) U.S. Cl.
CPC ........ *F16K 37/0058* (2013.01); *F16K 31/042* (2013.01)

(58) Field of Classification Search
CPC ........................... F16K 37/0058; F16K 31/042
See application file for complete search history.

(56) References Cited

U.S. PATENT DOCUMENTS

| | | | |
|---|---|---|---|
| 4,518,008 A * | 5/1985 | Fenster .................. | A62C 37/50 137/554 |
| 4,774,494 A | 9/1988 | Extance et al. | |
| 5,216,245 A * | 6/1993 | Keegan .............. | G01D 5/34776 250/226 |
| 7,138,623 B2 * | 11/2006 | Shahbazi ................. | G01D 5/28 356/615 |
| 10,094,469 B2 * | 10/2018 | Kirilenko .................. | G01D 5/34 |
| 2005/0094159 A1 | 5/2005 | Su | |
| 2008/0257428 A1 | 10/2008 | Scholz et al. | |
| 2015/0034848 A1 | 2/2015 | Penning et al. | |
| 2016/0195195 A1 * | 7/2016 | Lv ......................... | F16K 31/047 251/129.11 |

FOREIGN PATENT DOCUMENTS

| | | |
|---|---|---|
| EP | 0997707 A1 | 5/2000 |
| EP | 3480502 A1 | 5/2019 |
| WO | 2005047826 A2 | 5/2005 |
| WO | 2005047826 A3 | 5/2005 |

OTHER PUBLICATIONS

European Search Report for Application No. 21461513.0, mailed Aug. 25, 2021, 9 pages.

* cited by examiner

*Primary Examiner* — Angelisa L. Hicks
(74) *Attorney, Agent, or Firm* — CANTOR COLBURN LLP

(57) ABSTRACT

A position detection assembly for detecting a spatial position of a moveable element. The assembly includes a colour sensor and one or more colour indicators provided on a surface of the moveable element. The colour sensor is spaced from the surface of the moveable element and arranged to emit light onto the surface and detect light reflected from the surface and to determine the position of the element based on the reflected light.

4 Claims, 5 Drawing Sheets

VALVE POSITION DETECTION

CROSS-REFERENCE TO RELATED APPLICATIONS

This application claims priority to European Patent Application No. 21461513.0 filed Feb. 15, 2021, the entire contents of which is incorporated herein by reference.

BACKGROUND

The present disclosure is concerned with detecting the position of a valve, in particular of a rotational valve.

TECHNICAL FIELD

There are many applications, in various fields, where a fluid flow is regulated or controlled by opening and closing valves. In water supply or sanitation systems, for example, the flow of water through the system is managed by opening and closing valves to allow, block or direct the flow of water. Manually operated valves may be opened or closed by turning a handle or lever. Many systems use automatic or motorised valves that are opened or closed by means of an electric motor. Valves often include a valve body providing fluid inlets/outlets and a closure element having one or more passages therethrough. The position of the closure element relative to the valve body either allows the flow of fluid from an inlet, through the passage, to an outlet, when the passage is aligned with the inlet/outlet, or, when the passage is not aligned with the inlet and/or outlet, flow of fluid through the valve is blocked. Some valve may comprise directional closures that have an open position when position in one direction and a closed position when positioned in another direction. Other valves may be rotational valves. A rotational valve comprises a rotational closure element that rotates relative to the housing between the valve open and the valve closed position. An example of a rotational valve is a ball valve where the closure element comprises a ball-type closure element located in the valve housing, and have a passage formed therethrough, and a shaft attached thereto. To open and close the valve, the shaft is rotated either manually or by a motor to rotate the ball and, therefore, the passage relative to the housing and so relative to the inlet(s)/outlet(s).

It is generally desirable to know the rotational position of the valve closure element with respect to the housing to determine whether the valve is open/closed or, where a valve can be partially open, then to determine the degree to which the valve is open and to determine the rate of fluid flow through the valve.

It is known to use a position sensor comprising micro-mechanical switches to determine the directional or rotational position of a valve. Such position sensors for rotational valves operate on the basis of the valve shaft having an irregular outer shape such that different micro-mechanical switches are actuated due to contact of the outer circumference of the shaft according to the rotational position of the shaft. Such position sensing requires the valve shaft to have an irregular or specific shape, and the micro-mechanical switches arranged around the shaft are complex, bulky and prone to wear. The shaft and the micro-mechanical switches have to be manufactured to high tolerance levels to provide an accurate position determination. Tolerances of each part of the sensor require time-consuming and careful assembly of the sensor components if, for example, false readings or spurious signals are to be avoided. The complex mechanical construction of such sensors requires the overall valve structure to be large. Furthermore, there are limitations to the use of such assemblies in high vibrational environments.

There is a need for a smaller, simpler valve position detection assembly and method.

SUMMARY

According to a first aspect, the disclosure provides a valve position detection assembly comprising a position detection assembly for detecting a spatial position of a moveable element, the assembly comprising a colour sensor and one or more colour indicators provided on a surface of the moveable element, the colour sensor being spaced from the surface of the moveable element and arranged to emit light onto the surface and detect light reflected from the surface and to determine the position of the element based on the reflected light.

According to another aspect, the disclosure provides a method of detecting valve position comprising a method of detecting the position of a moveable element one which one or more colour indicators are provided, the method comprising emitting light towards the moveable element and determining the position of the element based on the wavelength of the reflected light.

BRIEF DESCRIPTION OF THE DRAWINGS

Examples of a position detection assembly according to the disclosure will now be described by way of example only, with reference to the drawings.

DETAILED DESCRIPTION

Figure 1:
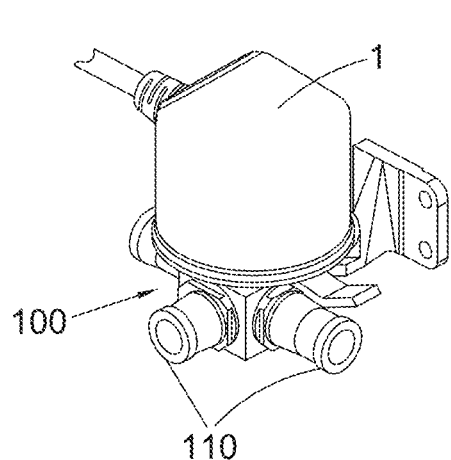
FIG. 1 is a perspective view of an example motorised valve assembly

Referring first to FIG. 1, a typical motorised valve assembly is shown comprising a valve body 100 having inlets and outlets 110 to be connected, respectively, to a fluid supply and to a fluid output or reservoir. The valve controls the flow of fluid from the supply to a destination, when a fluid flow passage is provided between an inlet and an outlet. A valve closure (not shown in FIG. 1) is provided inside the valve body, between the inlet(s) and outlet(s) such that the position of the valve closure relative to the inlets and outlets controls the flow of fluid therebetween.

An example of the valve closure is a ball closure having a passage defined therethrough. A shaft (not shown in FIG. 1) connected to the ball is rotated to rotate the ball to change the position/orientation of the ball passage relative to the valve body inlet(s)/outlet(s) to vary the size of a flow passage defined by the ball closure passage's alignment with the inlet(s)/outlet(s). In a manual valve, the shaft can be rotated by means of a lever or handle. In a motorised valve, the shaft is rotated by a motor (10, 10' in FIGS. 7 and 8). The motor and shaft are located in a housing 1.

Figure 2:
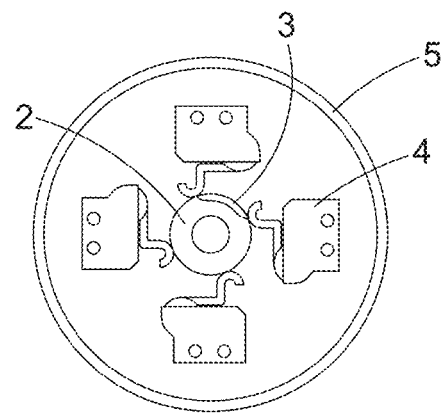
FIG. 2 is a cross-sectional view of an example micro-mechanical switch position sensor assembly.

FIG. 2 shows a conventional position detection assembly for such valves and is a cross-section through the housing 1. FIG. 2 shows the shaft that rotates the ball element. Typically, the 'shaft' actually comprises a ball shaft 2 connected directly to the closure element, and a cam shaft 3 connected to the motor. In the conventional assembly shown in FIG. 2, the rotational position of the cam shaft 3 and, hence, the ball shaft 2 and the closure (not shown) is determined by a plurality of micromechanical switches 4 around in the housing 1 around the cam shaft 3. The camshaft 3 has a shaped or cam outer surface. As the shaft rotates to different positions, because of the cam surface, different parts of the surface will actually contact different switches 4 depending on the rotational position of the shaft. The switches will provide signals, depending on whether or not they are contacted by the shaft at a given position, and the signals can be used to determine the rotational position of the cam shaft, knowing its shape.

The housing 1 needs to be big enough to contain the complex mechanical switches, thus making the overall valve assembly large and bulky. Furthermore, the assembly requires precisely machined cam shaft surfaces and precisely manufactured and assembled switches 4.

The present disclosure provides a valve position detection assembly comprising a colour sensor. This will be described further with reference to FIGS. 3 to 6.

According to the disclosure, the position detection assembly comprises one or more colours provided at one or more locations on an outer surface of the valve shaft and one or more colour sensors positioned spaced from the outer surface of the shaft.

Figure 3:
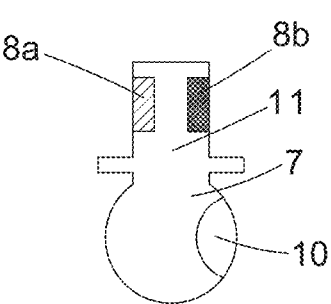
FIG. 3 is a side view of a valve shaft modified according to this disclosure.

FIG. 3 is an example of a ball valve closure 7 in the form of a ball 7 with a passage 10 therethrough. The ball 7 is rotated relative to the valve housing in which it is located, by rotation of a shaft 11. The shaft may be rotated manually or by means of a motor. One or more colour indicators 8*a*, 8*b* are provided on the shaft. In the example shown, two or more colour indicators are provided at different circumferential positions on the shaft 11. It is also feasible that only a single colour indicator may be provided to determine only a single (e.g. fully open or fully closed) position. Another possibility would be to have colour indicators of different sizes or shades or intensities or, where more than one sensor is provided, the indicators could be at different axial positions.

Figure 4:
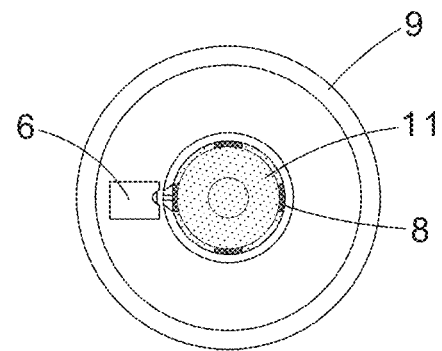
FIG. 4 is a sectional view showing a position detection assembly according to the disclosure.

FIG. 4 shows the assembly in cross-section, where the components are mounted in a housing 9, similar to housing 1. Also located in the housing, spaced from the shaft 11, is a colour sensor 6, positioned and directed to detect the colour indicators 8 as the shaft rotates and the colour indicators pass the sensor 6.

The colour indicators can provided in any known manner on the shaft e.g. as paint or as a sticker, with a colour anodized coating if provided on an alloy component, a paint coating on a steel or composite shaft etc. The shaft itself can have a simple e.g. circular cross section and regular outer surface.

Various types of sensor are known, some of which will be described below. Such sensors are simpler and smaller than micro-mechanical switches, and so the housing 9 can be smaller than the conventional housing 1.

Figure 5:
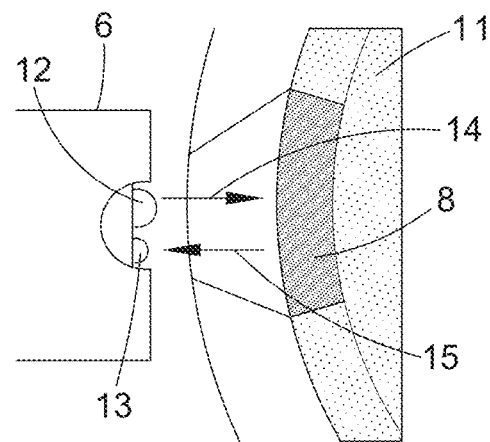
FIG. 5 is a schematic partial view of a position detection assembly according to one example of the disclosure.

In one example, as shown in FIG. 5, the colour sensor 6 contains a RGB LED 12 and a photoresistor 13. This may be an off-the-shelf component or may be specifically designed.

The LED 12 emits light beams of different colours 14, independently, towards the rotating shaft 11. As the shaft 11 rotates, light is reflected back to the photoresistor 13 from the surface of the shaft 11. The sensor 6 is arranged to detect reflection 15 of the same colour as emitted from the LED. The sensor can, therefore, detect when a colour indicator 8 of a specific colour is at a position to receive and reflect the particular colour light emitted 13 by the LED 12. In this way, the sensor knows when certain colour indicators 8 are at certain rotational positions because of the colour of reflected light 15. For example, when a red indicator is reflecting light from the LED back to the sensor 6, the assembly will know that that red indicator is at a position resulting from the ball being in, say, a fully open position. When, say, a yellow indicator is at that position, this may be an indication that the ball is in the fully closed position.

In its simplest form, the assembly has only a single colour sensor as shown in FIG. 4. More sensors may be provided around the shaft, but this will require careful and precise assembly to account for component tolerances.

The colours may be different colours or different patterns or shades of colours, or may be indicators arranged to reflect colours at different intensities.

Figure 5A:
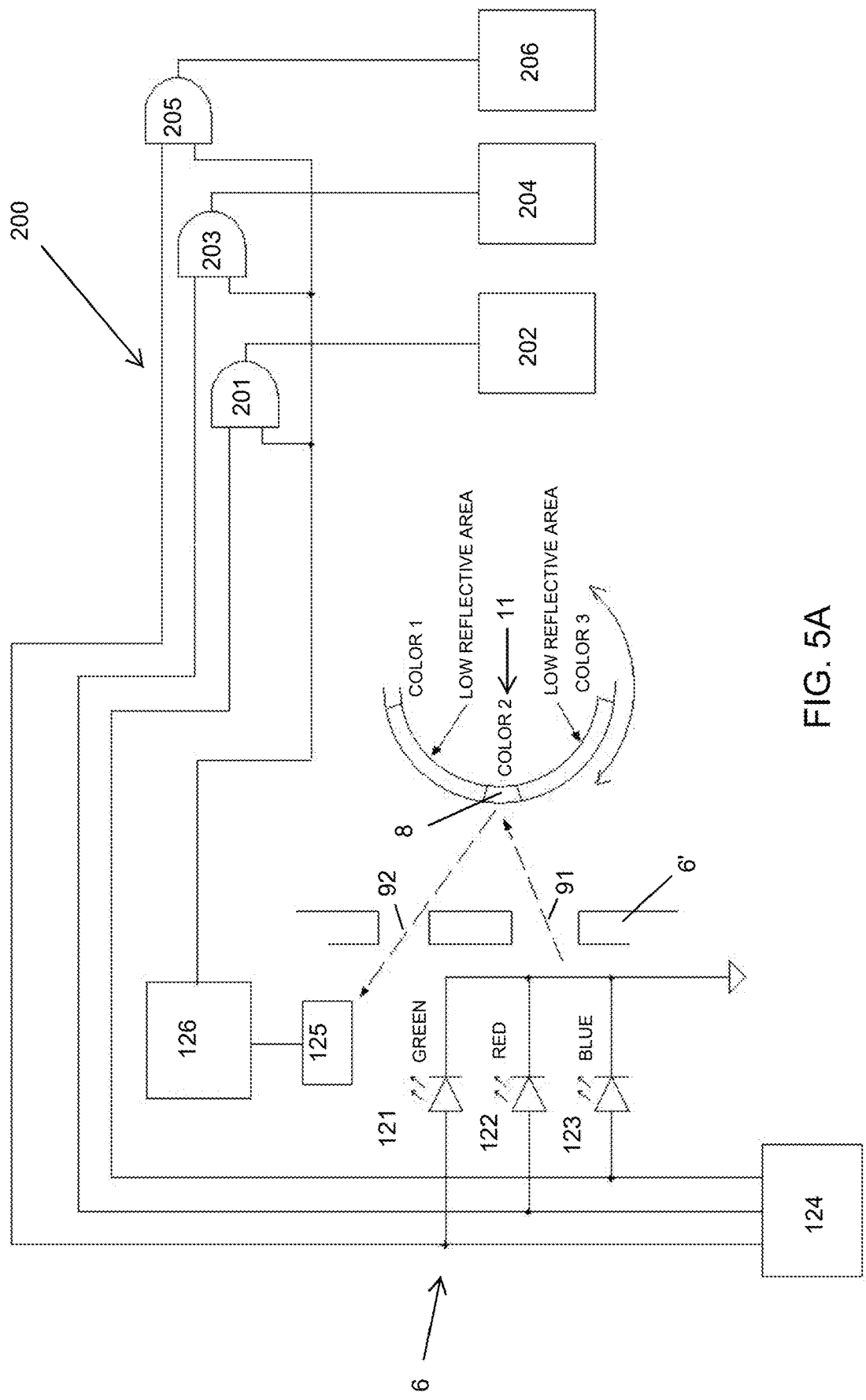
FIG. 5A shows in more detail the operation of an assembly such as shown in FIG. 5.

The function of such an assembly is described further with reference to FIG. 5A. As described above, colour indicators 8 are provided around the outer surface of the shaft 11 at known locations. In the example, three different colour indicators—colour 1, colour 2 and colour 3—are applied spaced at defined locations around the shaft outer surface. The sensor 6 is arranged in a sensor housing 6' spaced from the rotating shaft 11. The sensor housing has an aperture 91 through which the sensor emits light towards the shaft and an aperture 92 through which the sensor receives light reflected from the shaft. Here, these are shown as two separate apertures, but a single aperture could be provided.

The sensor includes an RGB LED arrangement here shown as green LED 121, red LED 122 and blue LED 123. LED driver 124 controls the switching of the LEDs 121, 122, 123 so that light of different wavelengths is alternately and separately emitted towards the shaft 11 i.e. the arrangement switches between blue, red and green light. Light is reflected back from the shaft to an optical receiver 125. Optionally, the received light is measured by a density measurement and comparator block 126 to filter out any stray light and the received light signal is sent to a logic circuit 200 to determine, based on the colour of light emitted and the known positions of the colour indicators relative to each other around the shaft 11, at a given time, which colour indicator reflected the light and, therefore, the rotational position of that colour indicator and, therefore, the rotational position of the shaft. For example, if blue light is reflected when the blue light is emitted (AND gate 201), it is determined that at that time of emitting the blue light, the blue colour indicator was opposite the sensor and from that the rotational position of the shaft at that time can be determined (202). Similarly if red light is emitted and reflected (AND gate 203) the 'red' position of the shaft is determined (204) and if green light was emitted and reflected (AND gate 205), the 'green' position of the shaft is determined (206).

In the example described above, the sensor is simple and relatively accurate. It may be necessary to switch the colour of the emitted light several times to get an accurate reading but this has been found to be sufficiently accurate and responsive for most applications.

An alternative solution, which is slightly more complex and requires more accurate anchoring of the sensor, but provides greater accuracy, involves the emission of white light from the sensor. The different colour indicators 8a, 8b, will absorb different parts of the white light and reflect light of the same colour as the indicator. Again, from the information from the reflected light, the position of the shaft can be determined.

Figure 6:
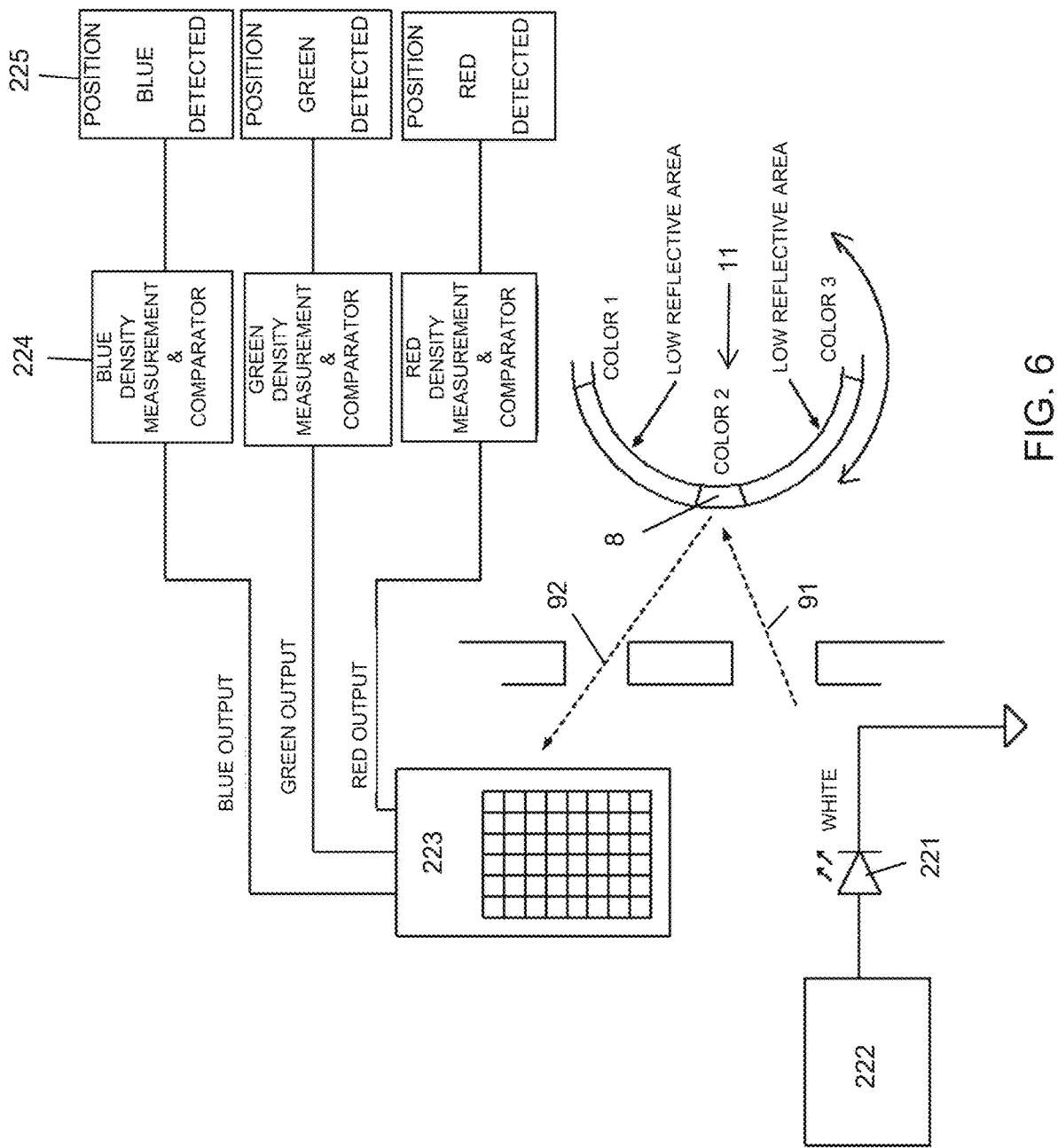
FIG. 6 is a schematic functional diagram of a position detection assembly according to an alternative example.

An example of such an arrangement is shown in FIG. 6. Here the emitter is a white light emitting diode 221 powered by an LED power supply 222. White light is emitted towards the rotating shaft 11 and is reflected by the shaft. The reflected light is detected by a colour sensor array 223 integrated into a single chip component e.g. an off-the-shelf product e.g. TCS230. Depending on the colour indicator that reflected the light, a different colour of reflected light will be detected, providing, according to the position of the respective colour markers 8 when the emitted light hits the shaft, a different colour output from the colour sensor array 223. The output of the array is provided to a density measurement and comparator unit 224 and the position is of the shaft can, therefore, be determined. (225).

Figure 7:
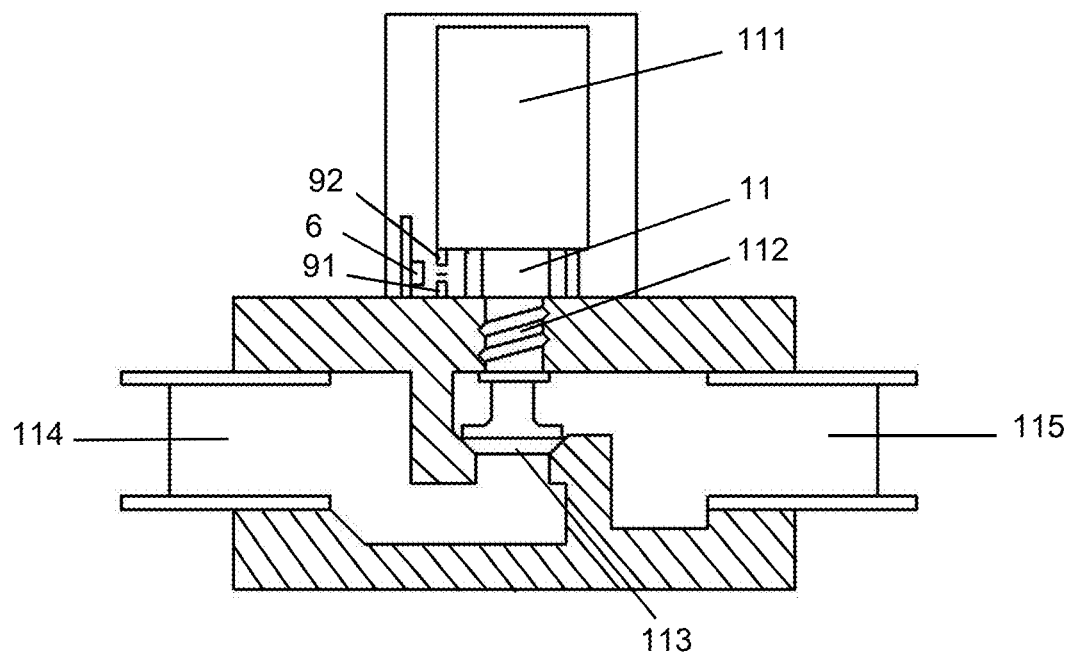
FIG. 7 shows a position detection assembly according to the disclosure incorporated into a regulation valve.

FIG. 7 shows how the position detection assembly can be incorporated into a regulation valve having a shaft 11 driven by a motor 111, the shaft rotating a drive 112 to move a flow or pressure regulator 113 to control fluid flow between a valve inlet 114 and a valve outlet 115. The sensor 6 is mounted spaced from the rotating shaft 11.

Figure 8:
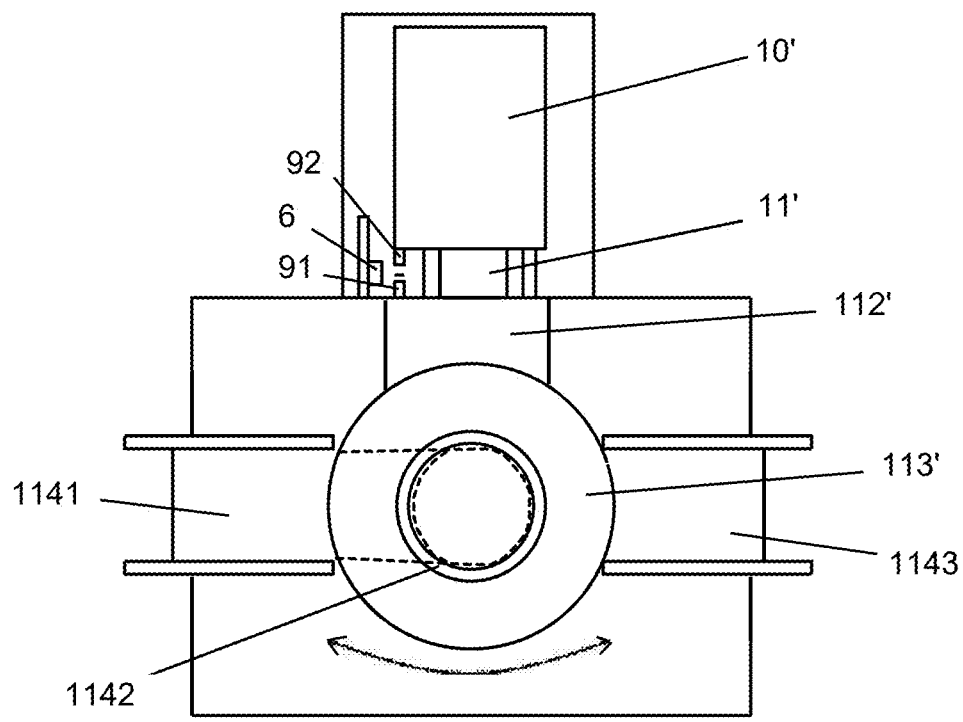
FIG. 8 shows a position detection assembly according to the disclosure incorporated into a directional valve.
Figure 8A:
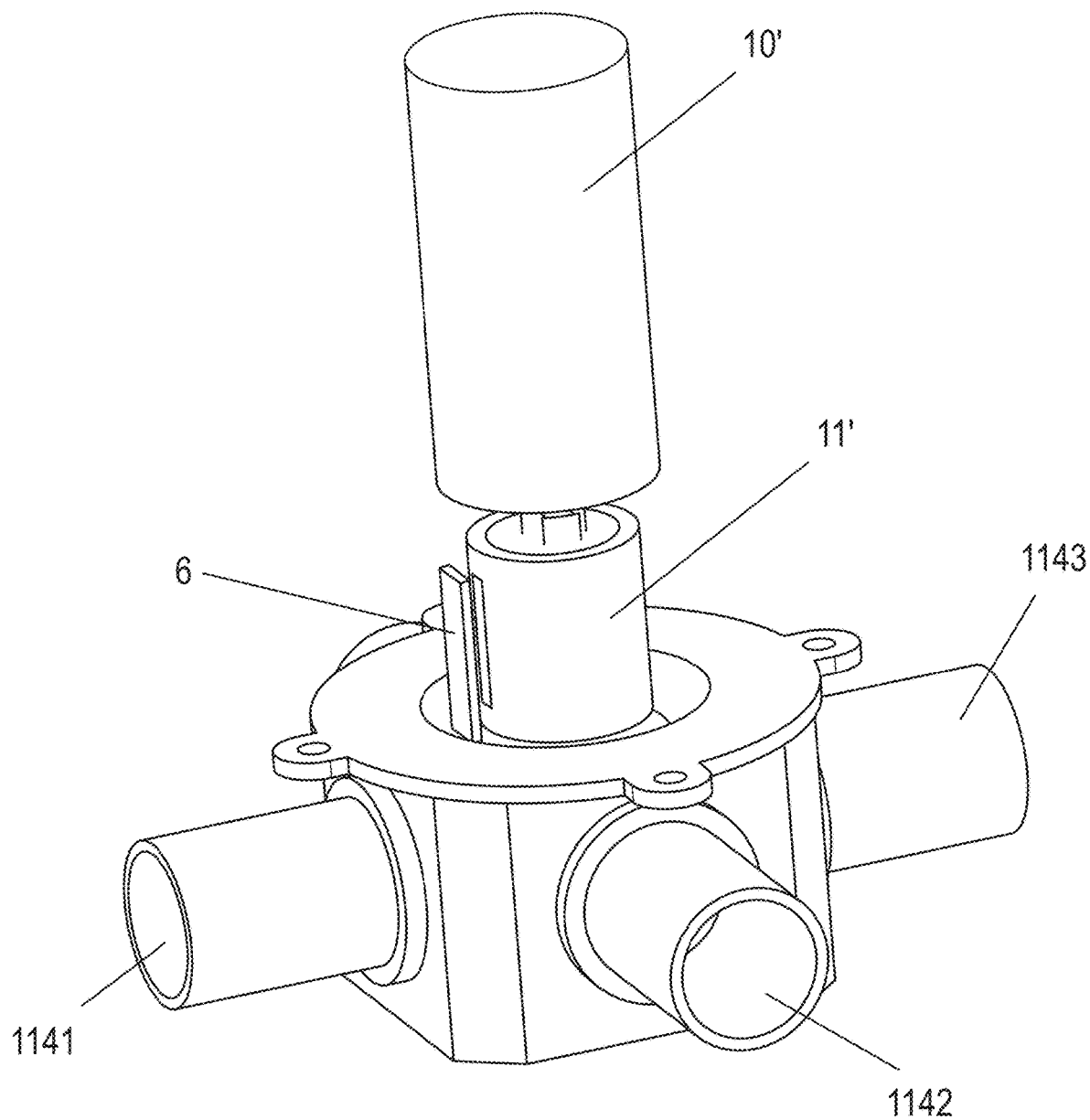
FIG. 8A is a 3D view of the valve of FIG. 8.

The same concept could be used for determining the position of a directional valve an example of which is shown in FIGS. 8 and 8A.

Again, the valve comprises a shaft 11' driven by a motor 10', the shaft driving a drive 112' which rotates a ball shaft 113' to open and close passages between different flow ports 1141, 1142, 1143.

The colour sensor assembly for detecting valve position is a simple, inexpensive, robust solution that requires less calibration or regulation on assembly, has fewer parts and smaller overall size, and has parts that are less susceptible to wear, thus maintaining accuracy.

The invention claimed is:

1. A valve assembly comprising:
a valve having a housing;
a rotatable valve closure element, rotatable relative to the housing by means of a rotary shaft; and
a position detection assembly for detecting a spatial position of the rotatable valve closure element, the position detection assembly comprising:
a colour sensor;
a first colour indicator connected to a surface rotary shaft at a first position;
a second colour indicator connected to the surface of the rotary shaft at a second position, wherein the second position is different that the first position and the first and second colors are different colors;
wherein the colour sensor is on the valve housing spaced from the surface of the rotary shaft and arranged to emit light onto the surface of the rotary shaft and detect light reflected from the surface of the rotary shaft and to determine the position of the rotary valve closure element based on the reflected light, wherein the colour sensor emits white light and determines the position of the valve closure element based on the colour of the reflected light reflected from the colour indicators on the shaft of the rotary shaft; and
wherein the colour sensor emits light of different colours at different times and determines the position of the rotary valve closure element based on the colour of the reflected light.

2. The valve assembly of claim 1, wherein the valve is a motorised valve.

3. A method of detecting the position of the rotary shaft of the valve assembly of claim 1, the method comprising:
emitting light towards the rotary shaft; and
determining the position of the rotatable valve closure element based on the wavelength of the reflected light.

4. The method of claim 3, further comprising:
rotating the rotary shaft such that the one or more colour indicators rotate past the emitted light as the rotary shaft rotates.

* * * * *